(12) United States Patent
Schmitz et al.

(10) Patent No.: US 11,141,904 B2
(45) Date of Patent: Oct. 12, 2021

(54) METHOD FOR MONITORING A FILM QUALITY AND FILM MACHINE

(71) Applicant: Windmöller & Hölscher KG, Lengerich (DE)

(72) Inventors: Torsten Schmitz, Greven (DE); Daniel Faustmann, Georgsmarienhutte (DE); Bernd-Alexander Groepper, Drensteinfurt (DE)

(73) Assignee: WINDMÖLLER & HÖLSCHER KG, Lengerich (DE)

( * ) Notice: Subject to any disclaimer, the term of this patent is extended or adjusted under 35 U.S.C. 154(b) by 225 days.

(21) Appl. No.: 16/340,678

(22) PCT Filed: Oct. 11, 2017

(86) PCT No.: PCT/EP2017/075955
§ 371 (c)(1),
(2) Date: Apr. 9, 2019

(87) PCT Pub. No.: WO2018/069399
PCT Pub. Date: Apr. 19, 2018

(65) Prior Publication Data
US 2019/0232543 A1    Aug. 1, 2019

(30) Foreign Application Priority Data

Oct. 11, 2016 (DE) .................... 10 2016 119 285.6

(51) Int. Cl.
*B29C 48/92*    (2019.01)
*B29C 48/08*    (2019.01)
(Continued)

(52) U.S. Cl.
CPC ............. *B29C 48/92* (2019.02); *B29C 41/26* (2013.01); *B29C 48/08* (2019.02); *B29C 48/914* (2019.02);
(Continued)

(58) Field of Classification Search
CPC ............... B29C 48/92; B29C 2948/00; B29C 2948/92209; B29C 2948/92247; B29C 2948/92295; B29C 41/26
See application file for complete search history.

(56) References Cited

U.S. PATENT DOCUMENTS

| 5,288,441 A | * | 2/1994 | Collins | ................... B29C 48/10 264/410 |
| 2002/0076459 A1 | * | 6/2002 | Joseph | .................... B29C 48/92 425/72.1 |

(Continued)

FOREIGN PATENT DOCUMENTS

| DE | 102014119206 A1 | 6/2016 |
| EP | 0917945 A2 | 5/1999 |

(Continued)

OTHER PUBLICATIONS

PCT/EP2017/075955 filed Oct. 11, 2017 International Report on Patentability dated Jan. 17, 2019.

(Continued)

*Primary Examiner* — Joseph S Del Sole
*Assistant Examiner* — Ariella Machness
(74) *Attorney, Agent, or Firm* — Kyle M. St. James; Rutan & Tucker, LLP

(57) ABSTRACT

The invention relates to a method for monitoring a film quality in the production of a plastic film, comprising the following steps: —determining a first temperature (10) of a film material (1) of the plastic film during a transport of the film material (1), in which the film material (1) is cooled along a conveying direction (2) of the film material (1). The invention further relates to a film machine (50) comprising a device for monitoring a film quality in the production of a plastic film.

16 Claims, 5 Drawing Sheets

Figure 1:
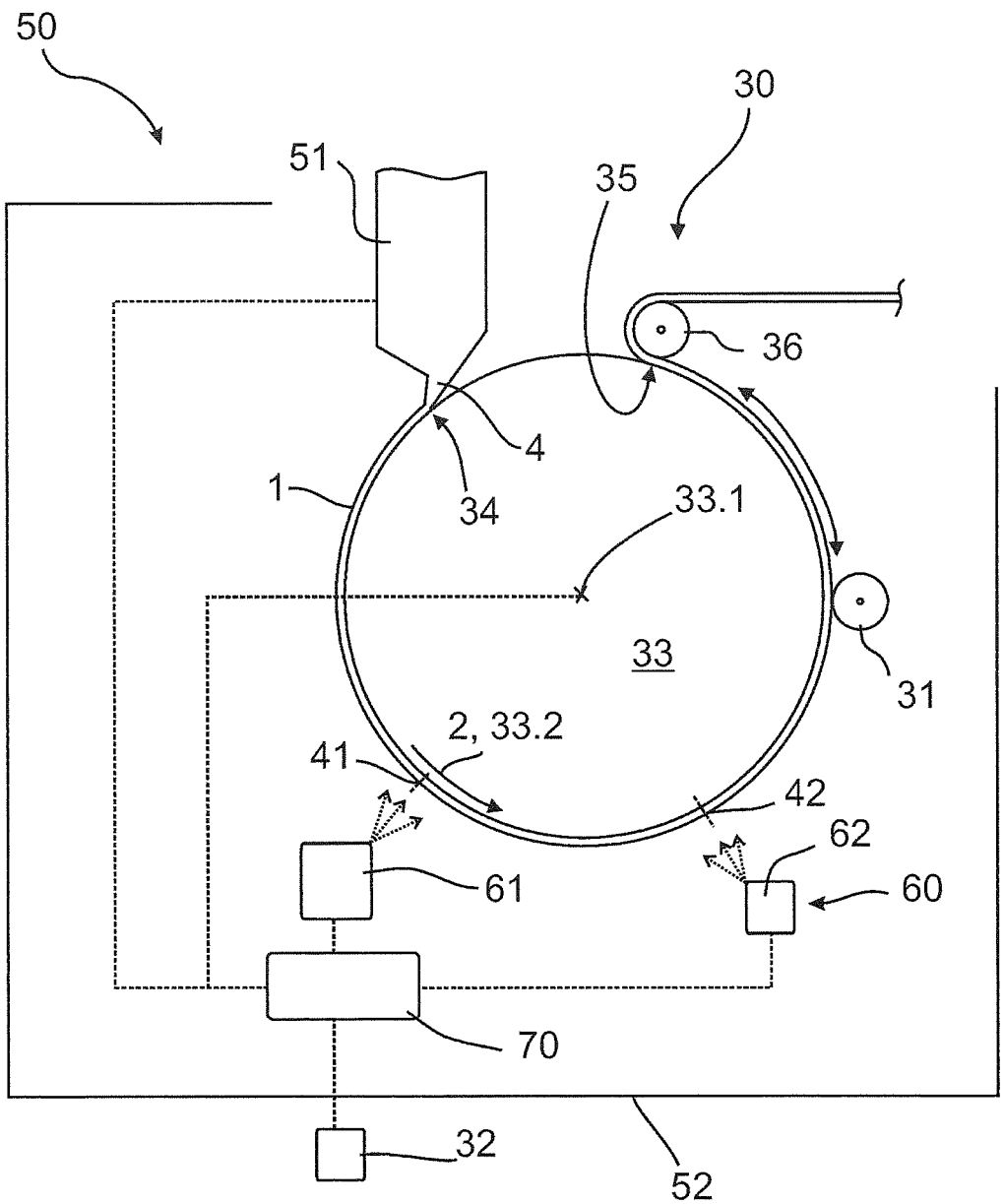

(51) Int. Cl.
B29C 48/88 (2019.01)
B29L 7/00 (2006.01)
B29C 41/26 (2006.01)

(52) U.S. Cl.
CPC ............... *B29C 2948/92209* (2019.02); *B29C 2948/92295* (2019.02); *B29L 2007/008* (2013.01)

(56) References Cited

U.S. PATENT DOCUMENTS

2017/0355122 A1 12/2017 Schmitz et al.
2019/0240888 A1* 8/2019 Lossl .................... B29C 48/919

FOREIGN PATENT DOCUMENTS

EP 1616687 A1 * 1/2006 ........... B29C 48/903
EP 1616687 A1 1/2006

OTHER PUBLICATIONS

PCT/EP2017/075955 filed Oct. 11, 2017 International Search Report and Written Opinion dated Apr. 19, 2018.
EP 17783832.3 filed Oct. 11, 2017 Office Action dated Jul. 13, 2020.

* cited by examiner

METHOD FOR MONITORING A FILM QUALITY AND FILM MACHINE

The invention concerns a method for monitoring a film quality during the production of a plastic film and a film machine with a device for monitoring a film quality during the production of a plastic film.

It is known from the state of the art that in a manufacturing method of a plastic film, flowable film material is discharged via an outlet device onto a transport device, in particular a casting roll, through an elongated outlet gap. The transport device is usually cooled so that the film material is cooled during rotation and/or movement of the transport device. During cooling, the film material passes through a temperature profile and at a certain point falls below its own solidification temperature, so that it begins to solidify. As a result, the film material is completely solidified into a film web at the take-off point on the transport device. Similar solidification processes are known from the production of a blown film, in which liquid film material is blown out of a blow head of an extrusion machine, whereupon the film material cools and solidifies.

It has been shown that said manufacturing method, in particular the production method for a plastic film, is only stable in terms of quality if the quality characteristics of the film to be produced only scatter randomly. Among others, mechanical properties of plastic film are a main quality feature. In order to analyze the mechanical properties, it is known from the state of the art to carry out an offline quality control, which means that laboratory tests are carried out at defined intervals during the start-up of the film machine and/or also during the manufacturing method. A sample of the film produced is taken and then a corresponding material test is carried out in the laboratory. This guarantees the adjustment phase for the production of the film as well as quality assurance. However, the respective sampling as well as the costly adjustment method and the quality check during the manufacturing method are often not sufficient or often lead to a reduced overall quality of the film, to a high effort regarding the sampling and last but not least to a high scrap material or a large quantity of lower quality goods.

It is also known that online monitoring of a film quality is carried out, whereby the position of a frost line at which the film material has solidified is used to determine the mechanical properties of the film ready for sale. However, since the position of the frost line again depends on various method parameters, it is desirable to further simplify the method for monitoring film quality.

Document U.S. Pat. No. 5,288,441 A shows a blown film extrusion in which film material is discharged via an outlet device. Document EP 1 616 687 A1 reveals a method and a device for monitoring production in the manufacture of tubular films, in particular blown extrusion films. Document EP 0 917 945 A2 shows a method for controlling the shrinkage of a film which cools on a roller arrangement.

It is therefore the object of the present invention to at least partially remedy disadvantages known from the state of the art. In particular, the object of this invention is to improve the monitoring of film quality in a simple and cost-effective way.

The preceding object is solved by a method and a device for monitoring a film quality with the characteristics of the claims.

Further characteristics and details of the invention result from the dependent claims, the description and the drawings. Features and details which have been described in connection with the method in accordance with the invention naturally also apply in connection with the film machine in accordance with the invention and vice versa in each case, so that with regard to the disclosure of the individual aspects of the invention, mutual reference is or can always be made.

According to the invention, the method for monitoring the quality of a film during the manufacture of a plastic film comprises the following steps:
  determining a first temperature of a film material of the plastic film during transport of the film material, wherein the film material cools along a conveying direction of the film material,
  provide a temperature-dependent definition of a quality condition of the film quality,
  evaluate the first temperature of the film material using the temperature-dependent definition of the quality condition.

By providing the temperature-dependent definition of the quality condition, the method is independent of a position of a frost line of the film material. The production of the plastic film can be, for example, a blown film production or a cast film production. The film material can be transported by means of a transport device in order to proceed from an outlet to a further processing device. Preferably the temperature of the film material of the plastic film can be determined before or at the transport device. The quality condition can advantageously be a certain property of the film material, such as transparency, which results after complete solidification of the film material. The temperature-dependent definition enables prediction directly from the first temperature in particular whether the quality condition is fulfilled or not. The first temperature can be a temperature that is measured at a certain point of the transport device of the film material. However, the first temperature can also be an arithmetic mean of several measured temperatures or a temperature curve. When evaluating the first temperature of the film material on the basis of the temperature-dependent definition of the quality condition, for example, the first temperature can be processed mathematically, so that a relationship is established between a property of the solidified film which reflects the quality condition and the first temperature. The determination of the first temperature may preferably involve the measurement of the first temperature. Advantageously, the first temperature can be determined by measuring the temperature or by a model. Thus, from defined parameters of the manufacturing method of the film material, a prediction of the first temperature can result, which in turn enables an evaluation via the temperature-dependent definition. The temperature-dependent definition can also be based on a cooling rate or a temperature gradient, which results from the first temperature and/or a further temperature, to infer a certain property of the film material.

Thus, a simple possibility is provided to monitor the film quality during the production of a plastic film, whereby a quality condition can be inferred from the first temperature. The temperature represents an easily influenced process parameter, so that, for example, by adjusting a vacuum during the extrusion of the film material or a speed of advance of the film material on the transport device, the temperature or the cooling method can be adjusted so that the property reflecting the quality condition can also be set for the finished plastic film.

The invention may also provide that the temperature-dependent definition of the quality condition has a temperature interval, the evaluation of the first temperature comprising a comparison of the temperature interval and the first temperature. The temperature interval can be derived from a relationship with a property of the plastic film or can be derived from it. In particular, the temperature interval can have two temperature limits. For example, if the first temperature is within the temperature interval, it may be provided that the quality condition is met and if the first temperature is outside the temperature interval, i.e. less than a first limit or greater than a second limit, a change in the method of manufacturing the plastic film may be required to meet the required quality condition. However, the temperature interval may also be an open interval, i.e. from 0 to an upper temperature limit, from minus infinity to an upper temperature limit, or from a lower temperature limit to infinity. Thus, it is possible by a simple comparison to evaluate the first temperature with regard to the quality condition without having to process it specifically and include it in a calculation. In particular, a comparison of whether the first temperature lies within the temperature interval is sufficient to evaluate the first temperature. The temperature interval can therefore be stored in a control unit and calculated before the start of the film quality monitoring method or recalculated for each evaluation of the first temperature. The temperature-dependent definition can therefore include the temperature interval and a modelling that relates the temperature interval to a required quality measure.

In the case of the method in accordance with the invention, it may also be provided that the quality condition and/or the temperature-dependent definition take into account at least one property of the film material and/or the plastic film which is relevant for the further processing of the film material. A property of the film material that is relevant for the further processing of the film material can be understood, for example, as a mechanical property, whereby a certain mechanical property is followed by a strength of the plastic film at a certain point in the method or at a certain position on the transport device. Thus, the mechanical property can serve as an indicator for the quality of the film product to be produced or as a property of the film product to be produced. For the further processing of the film material, any property of the film material and/or the plastic film that can influence the result of the customer's application of the plastic film can be particularly important. Thus, the further processing of the film material can include in particular the further processing of the film which has the film material or which is manufactured from the film material. Therefore, the property relevant for the further processing of the film material is preferably a property relevant for the further processing of the plastic film. Furthermore, the property relevant for the further processing of the film material can be directly a property of the plastic film, so that, for example, the temperature-dependent definition of a property, e.g. a maximum elasticity, of the plastic film can be closed. In particular, the quality condition can thus specify a target value for the property relevant for further processing of the film material. The target value can, for example, be a specified value of the property relevant for the further processing of the film material, which must at least be achieved in order to fulfil the quality condition. A connection between the target quantity of the property relevant for further processing of the film material and a temperature, in particular the first temperature, can be described by the temperature-dependent definition. Therefore, it may in particular be provided that the quality condition and the temperature-dependent definition take into account at least one property of the film material and/or the plastic film which is relevant for the further processing of the film material.

It is also conceivable that, in the case of a method according to the invention, the temperature-dependent definition of the quality condition includes at least a determination of the property relevant for the further processing of the film material as a function of the first temperature. Thus, for example, the first temperature can be processed directly and, in particular, a probable value or a probable characteristic of the property relevant for the further processing of the film material can be calculated or modelled via a mathematical relationship and/or a model between the first temperature and the property relevant for the further processing of the film material. A property interval can be provided with which the calculated value can be compared, whereby, for example, an expected maximum elasticity of the plastic film lies within certain interval limits if the quality condition is fulfilled. Similar to the temperature interval, the property interval can also be an open interval or comprise two interval limits in the form of property values. Thus, a model can be used to infer from the first temperature the property relevant for the further processing of the film material, whereby various other process parameters can be taken into account, so that the property interval in particular can be adapted adaptively. This results in a high degree of accuracy and the possibility of always taking into account the current environmental conditions of the method. Thus, for example, the temperature-dependent definition can specify an interval in which the quality condition is fulfilled if a certain modelling in dependence on the temperature leads to a prediction of the property relevant for the further processing of the film material and the prediction, which can be a concrete value or course in which the interval lies.

In the context of the invention, it is also conceivable that the property relevant for the further processing of the film material comprises a mechanical property, in particular a stress-strain behavior and/or a deformation behavior and/or a sealing behavior, of the plastic film. For example, the property relevant for the further processing of the film material can include a stress-strain behavior of the plastic film. It has generally been recognized that the temperature at a certain point in the method or at a certain position in the method can be used to determine a mechanical property, such as stress-strain behavior, of the plastic film. The stress-strain behavior of the plastic film advantageously includes e.g. an elongation capability. For example, a decisive factor for high elongation is slow cooling, especially of a high melting temperature of the film material. The slower the cooling method takes place, the longer the distance the flowable film material on the surface of the transport device travels together with it through the rotation of the transport device. The contact of the transport device with the film material is also referred to as the contact length. Depending on the rotation speed, a higher or lower temperature results at a certain point of the transport device and thus a longer or shorter cooling time. Stretchability is also a key quality feature of a plastic film. For example, a defined stretchability is necessary in order to be able to guarantee the desired stretch packaging on a pallet with sufficient safety. In the case of a stretch film, this is often wrapped around a pallet and the products arranged on it using robotic technology and is strongly deformed in the method. The elastic deformation has the effect of reserve forces in the material, which can act as holding forces on the product on the pallet and thus achieve the desired stabilization. It may therefore be necessary for a plastic film to have a minimum degree of elasticity and this can be guaranteed accordingly.

Preferably, the property relevant for further processing of the film material may include a deformation behavior of the plastic film. A deformation behavior of the plastic film can be understood, for example, as penetration resistance. Depending on the application, this can be interpreted as an important quality feature for the customer, so that a possibility of predetermining the deformation behavior is advantageous.

It is also conceivable that in a method in accordance with the invention, the property relevant for the further processing of the film material includes an optical property of the film material and/or the plastic film. The optical property may include transparency. The customer may wish that the products packaged with the plastic film are still visible through the film and that the plastic film has a minimum transparency at least after wrapping. Other conceivable optical properties are e.g. gloss, haze and/or clarity. Here, cloudy films can offer advantages, for example, in the application for window coatings or the like. Thus, there is a multitude of different application possibilities for plastic films in which optical properties play a role, especially during further processing. Early detection of possible defects during the manufacturing method is therefore an advantage in order to fulfil the quality condition as precisely as possible, preferably by adapting production conditions.

The invention also provides that the determination of the first temperature of the film material of the plastic film is to be performed before or on a transport device, in particular on which the film material cools down along the conveying direction of the film material. The film material is therefore preferably transported on the transport device and/or by the transport device along the conveying direction. The first temperature of the film material on the transport device can be determined by contact with the film material with or without a sensor. The transport device can preferably comprise a casting roller of a cast film method for the production of e.g. stretch films or other films. Thus, the determination of the first temperature of the film material can preferably be carried out on a casting roller of the transport device, since a significant part of the cooling method can take place on the casting roller. Alternatively, the transport device may include a calibration basket and/or a blown film take-off. An essential part of the cooling method takes place in the area of the transport device and/or in front of the transport device. Therefore, it is advantageous to determine the temperature in this area in order to be able to make reliable statements about the quality condition. Especially in blown film production, it is therefore advantageous to determine the temperature before the calibration basket in order to enable a high degree of accuracy with regard to the evaluation of the temperature.

In the case of a method according to the invention, it may also be provided that the first temperature is determined at least in sections in an axial direction transverse to the conveying direction of the film material on the transport device. The transport device, in particular a casting roller, can be configured in a cylindrical form which is mounted rotatably about a rotation axis. The cylinder-shaped transport device rotates preferably during the entire method for the transport and cooling of the film material arranged on the surface of the transport device. The determination of the temperature thus preferably extends over at least a section of this axial direction transverse to the conveying direction of the film material. Preferably, the first temperature is determined selectively or continuously over the entire length of the axial alignment of the casting roll. This enables detection additional tolerance deviations and, if necessary, prevent quality defects. For example, a reduced sealing in a vacuum box, which is preferably located in the method in front of the transport device, may result in an asymmetrical distribution of the temperature. This would lead to different elongation capabilities along the axial extension, i.e. the width of the film web. Such asymmetrical effects in the form of an inhomogeneous temperature over the axial length can thus be detected and eliminated in a subsequent step. In particular, at least one linear traverse can be provided to enable a sensor unit to be adjusted in the axial direction. In addition, several linear traverses can be linked to enable movements in other spatial directions.

It may also be provided that the first temperature is determined without contact, in particular by ultrasonic measurement and/or infrared measurement. One or more sensors can be used to determine the temperature. This can be particularly advantageous with regard to contactless determination. For example, the transmission, absorption and/or reflection of ultrasonic radiation can be used to draw conclusions about the temperature. In infrared measurement, for example, it is conceivable that an infrared sensor or an infrared camera could be used to cover an area of the film material and thus record a high volume of data in a short time so that the temperature of the area can be assessed at a specific point in time. In particular, an infrared measurement can also be used to simplify visualization. This is because, for example, the image from an infrared camera can easily be made visible to a user on a display.

The invention may also provide that the determination of the first temperature be carried out at least one first determination position. The first determination position can be a fixed or variable determination position. A fixed determination position can be understood to mean that the first determination position is fixed in its positioning in the method. Thus, it can be a pre-defined position whose position data, such as coordinates within a film machine, an operator or a control unit are known. For example, it can be provided at a specific point on the transport device so that the distance between the first determination position and a point where the film material is transferred to the transport device is constant. One advantage of a fixed determination position is that it is constant in relation to the manufacturing method of the plastic film and the first temperature recorded can therefore also be assigned to a certain point in the method. This may facilitate the evaluation of the first temperature of the film material based on the temperature-dependent definition of the quality condition. Thus, the fixed determination position results in a further parameter for which it is not necessary to take this into account in the temperature-dependent definition.

In the scope of the invention, it is also conceivable that the first determination position is changed during or after the determination of the first temperature in an axial direction and/or along a circumferential direction of the transport device. In particular, it is also conceivable that the first determination position may be changed along the conveying direction of the film material. It is conceivable, for example, that in blown film production in particular the height of the determination position relative to the substrate may be changed. Preferably, the circumferential direction of the transport device corresponds at least substantially to the conveying direction of the film material. As described above, the transport device may preferably have a casting roller. Alternatively, however, it may also be provided that the circumferential direction of the transport device is transverse to the conveying direction of the film material and/or the axial direction corresponds to an axis, in particular parallel to the conveying direction, of the film material. For example, the transport device can be suitable for use in a blown film method. If the first determination position is changed during or after the recording of the first temperature, different points of the cooling method of the film material on the transport device can be monitored with regard to the temperature and subsequently evaluated. A dispersion of temperatures at different points can also be evaluated. This can improve the accuracy of the evaluation, as the sample size is increased and measurement uncertainties can be compensated by changing the first determination positions, for example by forming an arithmetic mean. Preferably the first determination position is changed during or after the determination of the first temperature in the axial direction and along the circumferential direction of the transport device. This results in a large coverage of different areas of the transport device or the film material.

It is provided in a method according to the invention that a detection of a second temperature is detected at least one second, in particular fixed, determination position, the first and second determination positions being spaced apart in the axial direction and/or in the circumferential direction of the transport device. In particular, the first and second temperature can be evaluated using the temperature-dependent definition of the quality condition. This can further increase the accuracy of the method as the first and second temperatures can be taken into account. The first and second destination items may differ. For example, it is possible to provide two or more fixed determination positions which determine different temperatures or temperature values along the cooling method on the transport device. This can improve the statement about the relationship between the first temperature and the quality condition, since various measurement uncertainties and/or environmental conditions can influence the evaluation less or can be averaged out.

In a method according to the invention, a single temperature-dependent definition of a quality condition of the film quality is provided for each determination position and evaluated on the basis of the respective temperature at the respective determination position. Thus, for example, a temperature can be determined for each determination position, and this temperature can be determined on the basis of an temperature interval or to convert these into a property interval, so that the property relevant for the further processing of the film material, in particular the mechanical property, of the plastic film can preferably be evaluated directly. This can further increase the accuracy of the method, since the sample size can also be further increased by this measure, and a separate valuation is carried out for each determination item at the same time. This means that different temperature-dependent definitions can be provided for different determination positions, so that a temperature-dependent definition can be provided for each determination position for each method time.

In the context of the invention it is also conceivable that on the basis of the evaluation of the first temperature an indication for the change of a method parameter is given to a user. For example, a display can indicate that a certain method parameter needs to be changed in order to achieve or improve quality conditions. In particular, the method parameter can be proposed to the user automatically. However, it is also conceivable, in order to simplify the method, to simply inform the user that the quality condition has not been achieved or can be improved and that the user reacts to it independently. However, if the method parameter is already proposed automatically, the advantage is that the user has less room for error and can concentrate on other steps at the same time, so it is sufficient to just change the method parameter as suggested.

In the case of a method in accordance with the invention, it may also be provided that, on the basis of the evaluation of the first temperature, a method parameter for the production of the plastic film is controlled and/or regulated in order to adapt the film quality. Thus, the method parameter to be changed can be recognized by the film machine directly from the evaluation of the first temperature or can be determined at the beginning of the method on the basis of a given manipulated variable. In particular, the temperature-dependent definition of the quality condition or a definition to describe the method parameter can be used to intervene in the method and thus increase the quality of the plastic film. In particular, a control unit can form a control circuit which regulates the method parameter until the quality condition is met or improved by determining the first temperature and evaluating the first temperature on the basis of the temperature-dependent definition. Preferably, a vacuum for the production of the film material is changed during control and/or regulation of the method parameter. In particular, a vacuum box of the film machine can be specifically controlled for this purpose.

In the production of a blown film, the method parameter may include, for example, a cooling air flow parameter for cooling the film material and/or an extrusion device for the film material. In particular, the method parameter may include a supplied cooling air volume per time and/or a cooling air temperature of the cooling air flow and/or a height setting of a calibration device. In blown film production, the film material can preferably assume a circular or elliptical shape during transport, whereby the parameter of the cooling air flow can preferably be controlled via the circumference. Furthermore, it is conceivable that two control circuits are provided, the first control circuit comprising a control of a parameter of the sensor unit, in particular a control of a positioning of the sensor unit, and the second control circuit comprising a control of a further method parameter in the production of the plastic film.

It is also conceivable that, in the case of a method in accordance with the invention, the property relevant for the further processing of the film material and/or the first temperature and/or the temperature-dependent definition are displayed via a display unit. This can allow a user to check the current method data at any time during the method. At the same time a learning function can result, since the user can recognize with increasing experience certain connections between the property relevant for the further processing of the film material, the first temperature and the temperature-dependent definition, for example, to different environmental conditions, such as the ambient temperature or the like. Furthermore, the user can intervene in the method at any time, for example if he discovers a malfunction.

According to the invention, it can also be provided that before the actual manufacturing method of the plastic film is started, an adjustment method is carried out until the evaluation of the recorded temperature of the film material satisfies the quality condition. This allows, for example, to set the quality condition for a specific customer before the product is released for sale. During the adjustment time, rejects that do not meet the customer's quality requirements can be produced. In particular, the adjustment method can be 5 minutes to 80 minutes or 1 hour to 5 hours. During the adjustment method, for example, an average value, a minimum and a maximum property relevant for further processing of the film material, in particular mechanical property, can be determined and then all newly determined values can be set in relation to this value. From this point on, a trend function can also be generated for monitoring the manufacturing method of the plastic film, which is also composed of a ratio of the current property and the previously determined mean value. As long as this ratio remains within the previously determined limits, minimum value and maximum value of the mechanical property, all produced films can be evaluated as A-goods. If the described limits are violated, it is conceivable that the corresponding film is recognized as B-goods.

Within the scope of the invention, it is also conceivable that a calibration method is carried out after the adjustment process, whereby the temperature-dependent definition of the quality condition is determined or newly determined. Thus, for example, detailed method limits of the method parameters can be determined while the calibration method is being performed. During the calibration method, control and/or regulation can be performed to determine the temperature-dependent definition. For example, it can be provided that different measurements are carried out during the calibration method on the basis of which certain environmental influences can be taken into account, for example in constants within the determination of the temperature-dependent definition. Within the framework of the calibration method, it may in particular be provided that a sample is taken from the film and in particular tested in a laboratory with regard to the quality condition, so that the temperature-dependent definition can be determined or newly determined from the data and correlations obtained from it and in particular made available with it.

According to another aspect of the invention, a film machine with a device for monitoring a film quality is claimed for the production of a plastic film, in particular a blown film production or a cast film production. The film machine has an outlet means which is configured to deliver film material of the plastic film, in particular in the form of a melt plume, to in particular a transport device, so that the film material cools in front of and/or on the transport device. The film machine further comprises a sensor unit for detecting a first temperature of the film material in front of or at the transport device and a control unit for providing a temperature-dependent definition of a quality condition of the film quality and for evaluating the first temperature of the film material on the basis of the temperature-dependent definition of the quality condition. In particular, the control unit is configured to carry out the method according to one of the previous requirements. The enamel banner can be a section of the film material, which is continuously discharged in particular, which is at least partially still liquid and emerges from the outlet medium in order to be discharged onto the transport device. In particular, the control unit may be configured to perform an inventive method as described above. This means that the film machine according to the invention has the same advantages as those already described in detail with regard to a method according to the invention.

Figure 2:
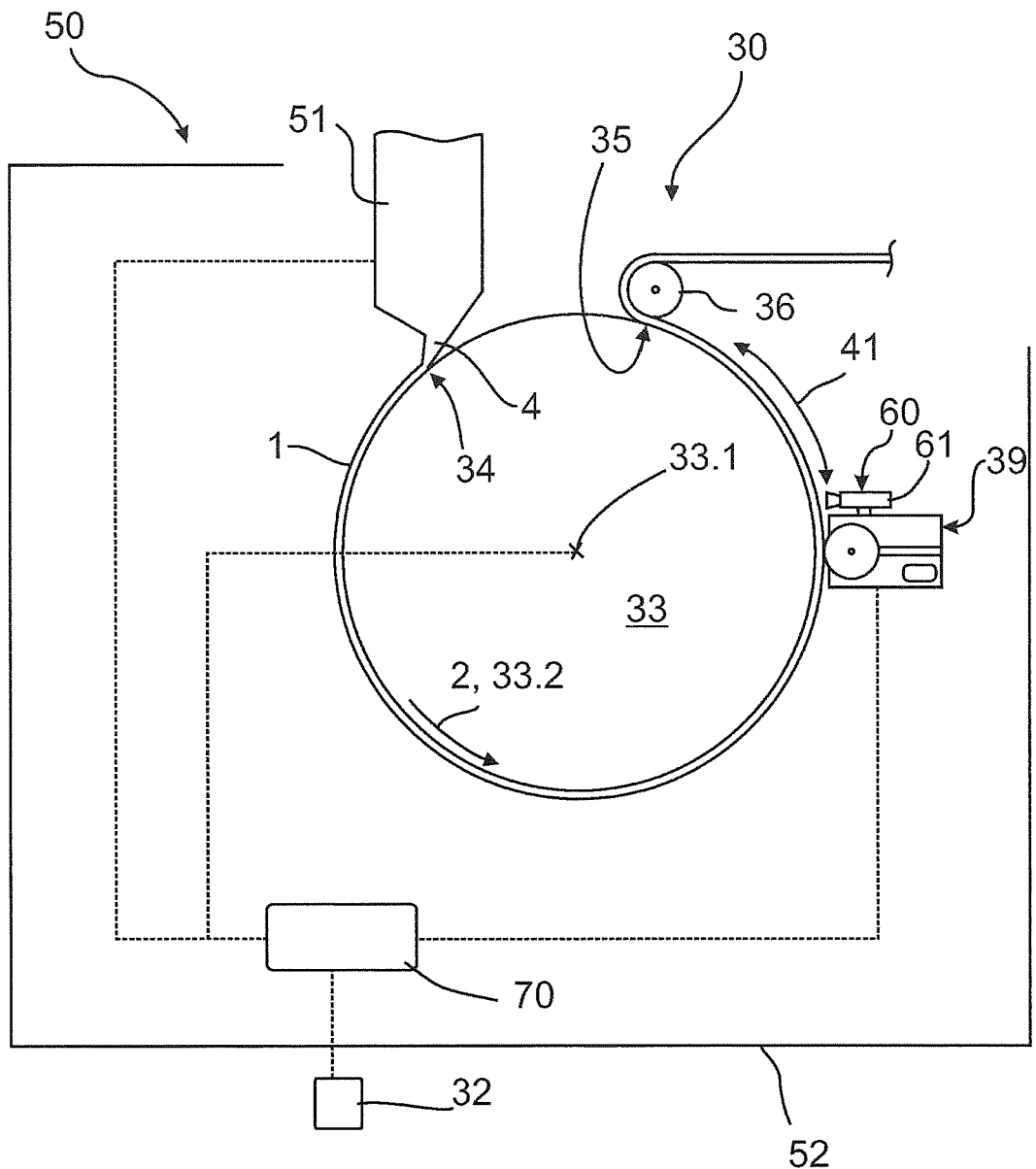
Figure 3:
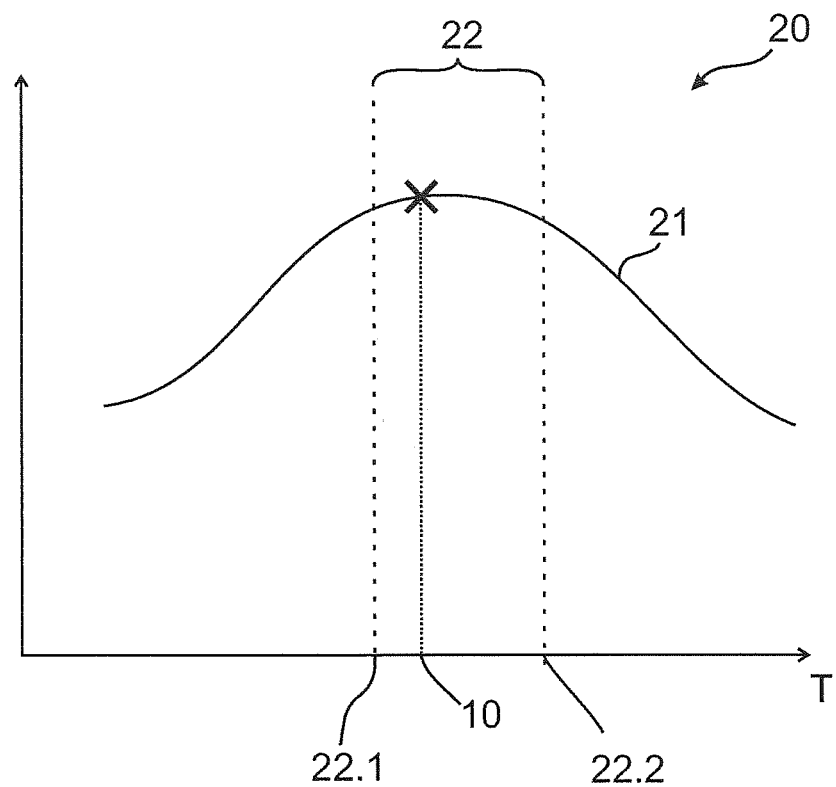
Figure 4:
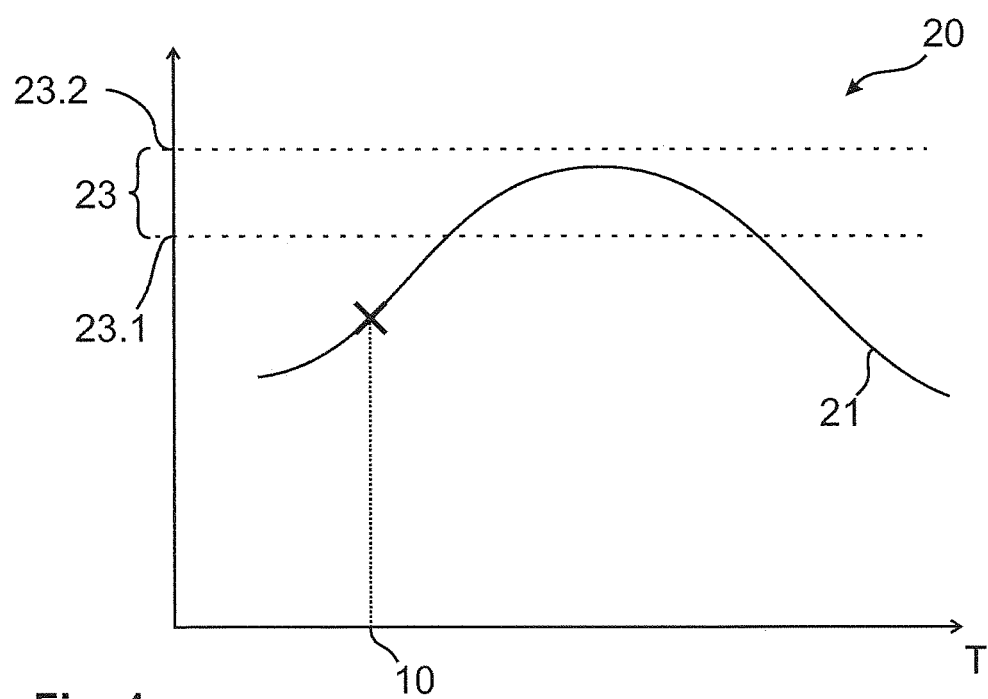
Figure 5:
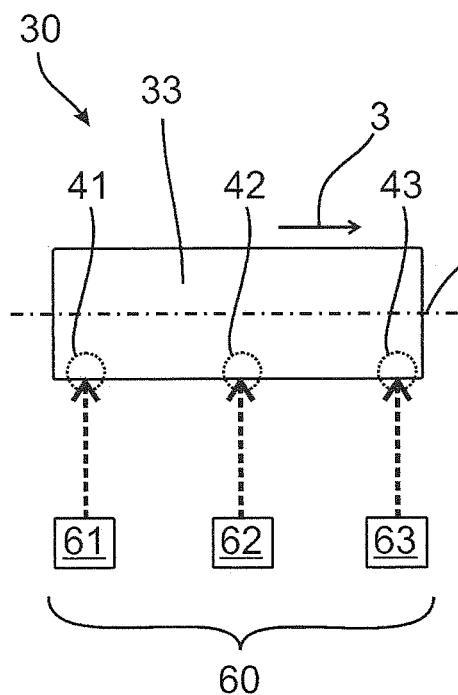
Figure 6:
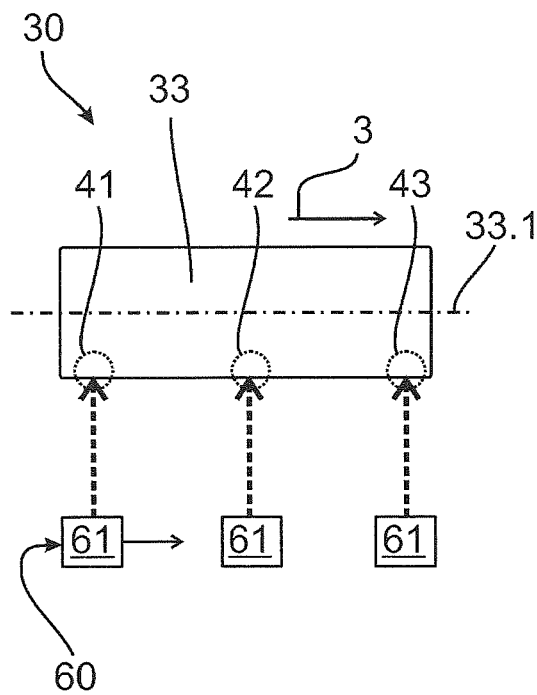
Figure 7:
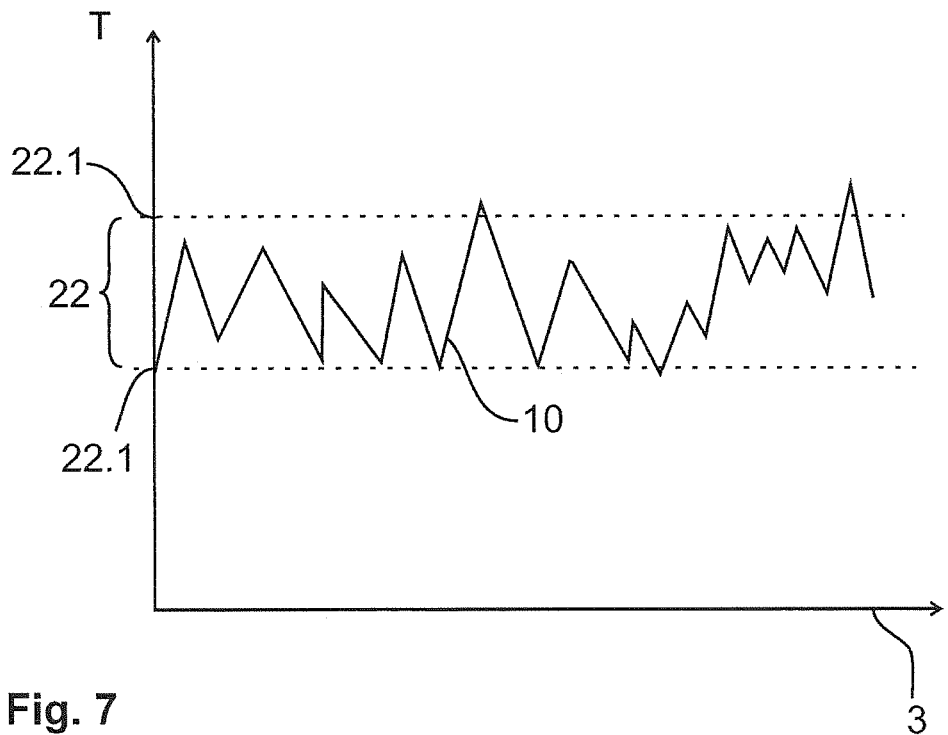
Figure 8:
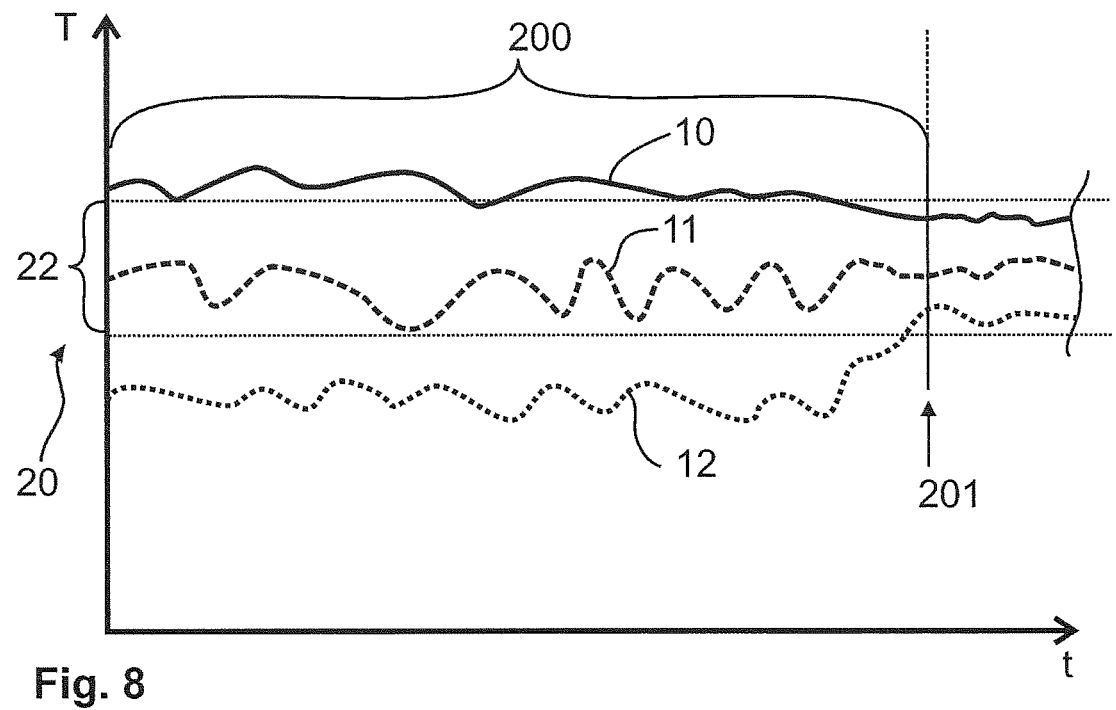
Figure 9:
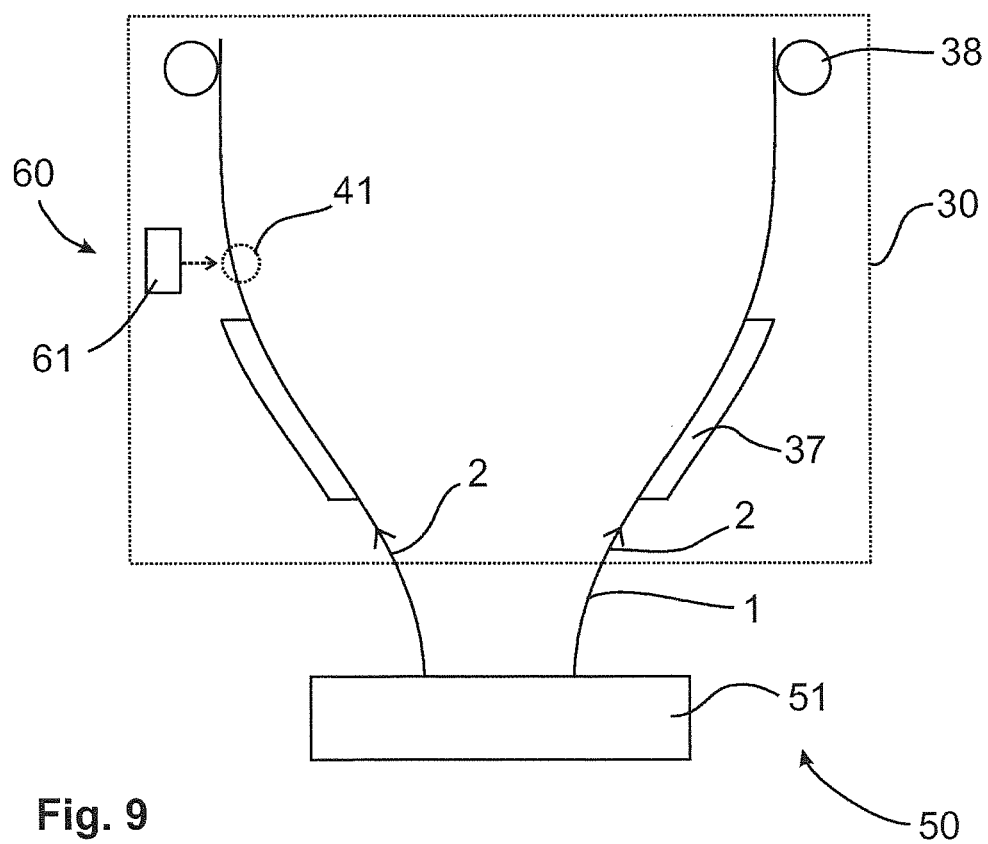

Further measures to improve the invention result from the following description of some embodiments of the invention, which are shown schematically in the figures. All features and/or advantages resulting from the claims, description or drawings, including configuration details, spatial arrangements and method steps, may be essential to the invention, both in themselves and in various combinations. It should be noted that the figures are only descriptive and are not intended to restrict the invention in any way. Show it:

FIG. 1 a film machine according to the invention for carrying out a method according to the invention in a first execution example in schematic view, FIG. 2 a film machine according to the invention for the execution of a method according to the invention in a further embodiment in schematic view, FIG. 3 schematic diagram with a temperature-dependent definition in another embodiment, FIG. 4 schematic diagram with a temperature-dependent definition in another embodiment, FIG. 5 transport device in a schematic top view in another embodiment, FIG. 6 transport device in a schematic top view in another embodiment, FIG. 7 temperature curve as a schematic diagram in another embodiment and FIG. 8 a temperature curve in a schematic diagram in another embodiment, FIG. 9 invention film machine for carrying out an invention method in a further embodiment in schematic view.

In the following figures, the identical reference signs are used for the same technical characteristics, even for different embodiments.

FIGS. 1 and 2 show at least a section of a film machine 50 according to the invention with a device for monitoring the quality of a film during manufacture, in particular cast film manufacture, of a plastic film in a first and a second configuration embodiment. The film machine 50 has an outlet means 51, from which a film material 1 in the form of a plastic melt can be transferred to a conveying device 30. The conveying device 30 comprises a casting roller 33 which is adapted to rotate along a conveying direction 2 which is a circumferential direction 33.2 of the casting roller 33. The film material 1, which is received at a receiving location 34 by the casting roller 33, is cooled accordingly. In particular, the casting roll 33 may contain additional coolants. For example, a cooling liquid may have flowed through the casting roller 33, so that heat can be removed from the film material 1 by the cooling liquid. Between the casting roller 33 and the outlet means 51, an enamel banner 4 is formed at receiving location 34, which is at least partially transported by the air and already undergoes a first cooling. Once the film material has cooled down completely, it can be removed from the casting roller 33 at a removal point 35 of a demolition roller 36 and thus processed further, whereby the film material 1 can be wound up by means of a winding device, for example. In addition to or as an alternative to the demolition roll 36, it may be provided that the film material 1 is guided onto a second cooling roll (not shown) in order to implement a further cooling stage. In particular, after solidification, film material 1 becomes a ready-to-sell plastic film. It has turned out that the cooling method, especially within the scope of the transport device 30, is decisive for the film quality of the plastic film, so that by monitoring the transport device 30 for the transport of the film material 1 statements about the expected film quality can be made. In particular, tests downstream of the plastic film manufacturing method which destroy the film material 1 or the plastic film can be avoided or reduced.

FIG. 1 in the first embodiment shows a sensor unit 60 which is configured to determine a first temperature 10 at a first determination position 41 and a second temperature 11 at a second determination position 42 for the film material 1. For this purpose, the sensor unit 60 has a first detection means 61 and a second detection means 62, which are each arranged at fixed positions in relation to a frame 52 of the film machine 50. The first and second detection means 61, 62 are especially configured to determine the temperatures 10, 11 of the film material 1 without contact. For example, the first and second detection means 61, 62 may have an ultrasonic sensor and/or an infrared camera to detect the temperatures 10, 11 at the determination positions 41, 42. The sensor unit 60 is also connected to a control unit 70, which provides a temperature-dependent definition of a quality condition of the film quality of the plastic film to be produced. The control unit 70 is also connected to a display unit 32, which can show a user the first and second temperature 10, 11 as well as data of the temperature-dependent definition 20 and/or the quality condition. In addition, an evaluation of the first and/or second temperature 10, 11 of the film material 1 can be carried out according to the temperature-dependent definition 20 by the control unit 70 or by an operator viewing the display unit 32. Although the advantageous recording of two temperatures 10, 11 is shown here, it may be sufficient if, in particular, only the first temperature 10 is recorded and processed. The automatic evaluation by the control unit 70 is particularly preferred, so that a method parameter for the production of the plastic film can be controlled and/or regulated to adapt the film quality. For example, the control unit 70 can communicate with the casting roller 33 to adjust the speed at which the casting roller 33 rotates and thus the film material 1 is moved along the conveying direction 2. In addition or alternatively, it is also conceivable that the control unit 70 is in communication with the outlet means 51 or another component of the film machine 50, so that, for example, the quantity of film material 1 to be conveyed can be adjusted. The control unit 70 can also communicate with a cleaning roller 31 of the transport device 30. Preferably, based on the signals of the control unit parameters, a vacuum box can be adapted to control the manufacturing method. The cleaning roller 31 can be adjusted along the conveying direction 2 of the film material 1, e.g. to improve the surface quality of the film material 1 and/or to remove particles from the method, in particular from the film material 1. The positioning of the cleaning roller 31 can also be based, for example, on the evaluation of the first temperature 10 and/or the second temperature 11. The recording of the first and/or second temperature 10, 11 by the sensor unit 60 can be carried out, in particular, according to one of the embodiments of FIG. 5 or 6, along a transport axis 33.1 around which the casting roller 33 rotates.

FIG. 2 shows a sensor unit 60 in the second embodiment, which has a variable determination position 41 instead of a fixed determination position. The sensor unit 60 comprises a first detection means 61, which is arranged on a support unit 39 of the transport device 30. The support unit 39 can be adjusted along a circumference of the casting roller 33 of the transport device 30, in particular along the conveying direction 2 of the film material 1, and the sensor unit 60 and/or the support unit 39 and/or a cleaning roller 31 can be in wireless communication with a control unit 70, in particular, so that a temperature-dependent definition 20 of a quality condition of the film quality can be provided by the control unit 70. As already explained in the first embodiment, the control unit 70 can be connected to a display unit 32, so that different information can be displayed on the display unit 32. For example, the first temperature 10, the temperature-dependent definition 20 and/or a note following an evaluation of the first temperature 10 of the film material 1 can be visualized for a user. Thus, a simple possibility is created to realize a monitoring of a film quality during the production of the plastic film. In particular, the first temperature 10 can be determined by the sensor unit 60 without contact, e.g. by an infrared camera and/or an ultrasonic sensor. Preferably, the determination of the first temperature 10 corresponds to the determination of the first temperature 10 of one of the examples in FIG. 5 or 6.

FIG. 3 shows a relationship between a property 21 relevant for the further processing of film material 1 and a temperature T of the film material, in particular for a specific determination position 41. Preferably, the property 21 relevant for the further processing of the film material 1 may include a mechanical property of the plastic film, in particular a stress-strain behavior and/or a deformation behavior. For each temperature T a value of the property 21 relevant for the further processing of the film material 1 can be determined, so that a curve results in the overall consideration. For example, according to the specification that a certain value of property 21 relevant for the further processing of film material 1 is to be achieved, a temperature-dependent definition 20 comprises a temperature interval 22, which has a lower temperature interval limit 22.1 and an upper temperature interval limit 22.2. If a first temperature 10 of the film material 1 of the plastic film on or in front of a transport device 30 is determined during the manufacturing method of the plastic film, an evaluation of the first temperature 10 of the film material 1 can be made on the basis of the temperature-dependent definition 20 of the quality condition. If the first temperature 10, as shown here, is in the temperature interval 22, i.e. between the lower temperature interval limit 22.1 and the upper temperature interval limit 22.2, the evaluation can be positive. Thus, it can be concluded that at least with a high probability the property 21 of the finished plastic film relevant for the further processing of film material 1 fulfils the quality condition, such as for example that a mechanical property should be above a certain value.

FIG. 4 also shows a further diagram with a property 21 relevant for the further processing of film material 1, which is plotted against a temperature T of film material 1. Preferably, the property 21 relevant for the further processing of the film material 1 may include a mechanical property such as stress-strain behavior and/or deformation behavior of the plastic film. Based on the quality condition, a temperature-dependent definition 20 can include a determination of the property 21 relevant for the further processing of film material 1 as a function of an initial temperature 10. For this purpose, a property interval 23 can be provided in which, according to the quality condition, the property 21 relevant for the further processing of film material 1 is to lie or in which a target value of the property 21 relevant for the further processing of film material 1 is to lie. The temperature-dependent definition 20 can also be used to determine, for each point of temperature T, a value of property 21 relevant for the further processing of film material 1, so that, when evaluating the first temperature 10 of film material 1 on the basis of the temperature-dependent definition 20, it can be determined whether the mechanical property assigned to the first temperature 10 lies within a property interval 23, composed of a lower property interval limit 23.1 and an upper property interval limit 23.2. As shown here, the temperature-dependent definition 20 shows that the value of property 21 relevant for the further processing of film material 1, which is assigned to the first temperature 10, lies outside property interval 23. Thus, an evaluation of the first temperature 10 of the film material 1 based on the temperature-dependent definition 20 of the quality condition can be negative, so that an adjustment of method parameters for the production of the plastic film can be controlled and/or regulated while simultaneously fulfilling the quality condition. In particular, a user can receive a warning or this can be done automatically by a control unit 70.

FIG. 5 also shows a transport device 30 in schematic plan view. A casting roller 33 of the transport device 30 rotates about a transport axis 33.1 to move film material 1 along a conveying direction 2, which is a circumferential direction 33.2 of the casting roller 33, and cool it. A sensor unit 60 is also provided, which has a first detection means 61, a second detection means 62 and a further detection means 63. The detection means 61, 62, 63 are arranged to the casting roller 33 in such a way that a first determination position 41, a second determination position 42 and a further determination position 43 can be monitored on the film material 1, so that a temperature of 10, 11 can be determined at each of the determination positions 41, 42, 43. The determination positions 41, 42, 43 are spaced in an axial direction 3, parallel to the transport axis 33.1 of the casting roller 33, so that the sample size is increased. In order to determine a first temperature 10, an average value can be formed from the temperatures recorded at the determination positions 41, 42, 43, so that smaller deviations can be averaged out over the width of the casting roller 33, or a single temperature 10, 11, 12 can be determined for each determination position 41, 42, 43, in order to obtain differentiated statements in the axial direction of the film material 1.

FIG. 6 shows a transport device 30 with a casting roller 33 in schematic plan view. The casting roller 33 rotates around a transport axis 33.1 according to the example in FIG. 5 in order to transport film material 1 along a circumferential direction 33.2, which corresponds to a conveying direction 2 of the film material 1. A sensor unit 60 is also provided, which has a first detection means 61. The first detection means 61 is adapted to be moved along an axial direction 3 of the casting roller 33 to be moved from a first determination position 41 to a second determination position 42 and/or to a further determination position 43. Thus, a single detection means 61 may be sufficient to monitor several determination positions 41, 42, 43 along the axial direction 3 of the casting roller 33. Furthermore, a first temperature 10 is determined, which is evaluated on the basis of a temperature-dependent definition 20. By recording the temperature 10 at several determination positions 41, 42, 43 it can be ensured that the quality condition is also fulfilled over the width of the film material 1, in particular not only selectively.

FIG. 7 shows a diagram in which a temperature T is plotted against an axial direction 3 of a transport device 30. The temperature T can, for example, be formed by a sensor unit according to one of the embodiments of FIG. 1, 2, 5, 6 or 9. Furthermore, a first temperature 10 is shown, which was determined by the axial direction 3 of the film material 1. Furthermore, a temperature interval of 22 is shown, which reflects a quality condition of the film quality of the film material 1. An evaluation of the first temperature 10 and/or the temperature-dependent definition 20 can include an average of the first temperature 10, so that finally it can be determined whether this average lies within the temperature interval or not. In addition or alternatively, the evaluation of the first temperature 10 may include determining whether the first temperature 10 at a point in axial direction 3 is within temperature interval 22 or is leaving temperature interval 22. Thus, the temperature interval 22 can define either an interval in which the quality condition is regarded as fulfilled or an interval in which the quality condition is regarded as not fulfilled.

FIG. 8 also shows a diagram in which a temperature T is plotted against a time t. Several temperatures 10, 11, 12 measured on one film material 1 are shown, which are variable over time t. In order to meet a quality condition of film material 1, an adjustment method 200 is first started, followed by a calibration method 201. This means that the method for manufacturing the plastic film or film material 1 can preferably be set first, whereupon the temperature-dependent definition 20 of the quality condition is determined or redetermined, so that the actual manufacturing method then starts within a temperature interval of 22 and the evaluation can also be carried out in accordance with the ambient conditions or further tolerances of the manufacturing method. The determination of the temperature-dependent definition 20 may include, for example, the removal and analysis of a sample of film material 1 and/or plastic film, in particular where the analysis is provided outside a transport device 30.

FIG. 9 shows at least a section of a film machine 50 in accordance with the invention with a device for monitoring a film quality in the manufacture, in particular a blown film manufacture, of a plastic film in a first and a second embodiments. Here film material 1 is conveyed from an outlet means 51 of the film machine 50 along a conveying direction 2. This causes the film material to expand into a bubble and cool down. The major part of the cooling of the film material occurs in front of and/or on a transport device 30, which has a guide means 38 and a calibration device 37. The guiding means 38 is preferably configured to guide the film material 1 and/or to support it during p. The calibration device 37 also holds the film material 1 preferably in shape. The calibration device 37 may preferably be located before or after the guide means 38. To determine a first temperature 10 of the film material 1 at a first determination position 41, a sensor unit 60 is provided which has a first detection means 61. The sensor unit 60 is preferably located on the transport device 30 or in the area of the transport device 30. Here, a temperature characteristic for the current manufacturing method can be determined in the form of the first temperature 10 and evaluated using a temperature-dependent definition 20. Furthermore, the sensor unit 60 can preferably communicate with a control unit 70, so that an evaluation of the first temperature 10 can be carried out via the control unit 70 and, in particular, method parameters can be adapted.

The preceding explanation of the form of embodiment describes the present invention exclusively within the scope of the invention exclusively within the scope of embodiments. Of course, individual features of the embodiments can be freely combined with each other, if technically reasonable, without leaving the scope of the present invention.

REFERENCE CHARACTER LIST

1 Film material
2 Delivery direction
3 Axial direction
4 Emulsion banner
10 First temperature
11 Second temperature
12 Further temperature
20 Temperature-dependent definition
21 Mechanical property
22 Temperature interval
22.1 Lower temperature interval limit
22.2 Upper temperature interval limit
23 Property interval
23.1 Lower property interval limit
23.2 upper property interval limit 30 Transport device
31 Cleaning roller
32 Display unit
33 Casting roller
33.1 Transport axis
33.2 Circumferential direction
34 Receiving Location
35 Removal location
36 Demolition roller
38 Guide means
37 Calibration device
39 Support unit
41 First destination position
42 Second destination position
43 Further destination position
50 Film machine
51 Outlet means
52 Frame
60 Sensor unit
61 First means of detection
62 Second means of detection
63 Additional means of detection
70 Control unit
200 Adjustment method
201 Calibration method

The invention claimed is:

1. A method for monitoring a film quality in the production of a plastic film, the method comprising:
determining a first temperature of a film material of the plastic film at a first determination position during a transport of the film material at which the film material cools along a conveying direction of the film material, wherein the determining of the first temperature occurs on a transport device;
providing a first temperature-dependent definition of a quality condition of a film quality pertaining to the first determination position;
determining a second temperature at a second determination position, wherein the first and second determination positions are arranged in an axial direction or in the circumferential direction of the transport device;
providing a second temperature-dependent definition of the quality condition of the film quality pertaining to the second determination position; and
evaluating the quality condition of the film quality by evaluating the first temperature determined at the first determination position based on the first temperature-dependent definition and the second temperature determined at the second determination position based on the second temperature-dependent definition.

2. The method according to claim 1, wherein the temperature-dependent definition of the quality condition of the film quality has a temperature interval, the evaluation of the first temperature comprising a comparison of the temperature interval and the first temperature.

3. The method according to claim 1, wherein at least one of (i) the quality condition of the film quality or (ii) at least one of the first or second temperature-dependent definitions of the quality condition of the film quality takes into account at least one property of the film material or of the plastic film which is relevant for further processing of the film material.

4. The method according to claim 3, wherein the first temperature-dependent definition of the quality condition of the film quality comprises at least one determination of the property relevant for the further processing of the film material of the plastic film as a function of the first temperature.

5. The method according to claim 3, wherein the property relevant for further processing of the film material of the plastic film comprises a mechanical property.

6. The method according to claim 3, wherein the property relevant for the further processing of the film material of the plastic film comprises at least an optical property of the film material or of the plastic film.

7. The method according to claim 1, wherein the first temperature is determined at least in sections in the axial direction transverse to the conveying direction of the film material of the plastic film on the transport device.

8. The method according to claim 1, wherein the first temperature is determined without contact.

9. The method according to claim 1, wherein the determination of the first temperature is carried out in at least one first determination position.

10. The method according to claim 9, wherein the first determination position is changed during or after the determination of the first temperature at least in the axial direction or in the circumferential direction of the transport device.

11. The method according to claim 1, wherein an indication for changing a process parameter is given to a user on the basis of the evaluation of the first temperature.

12. The method according to claim 1, wherein at least a process parameter for producing the plastic film for adapting the film quality is controlled or regulated on the basis of the evaluation of the first temperature.

13. The method according to claim 3, wherein at least the property relevant for further processing of the film material or the first temperature or the temperature-dependent definition is displayed via a display unit.

14. The method according to claim 1, wherein before an actual production process of the plastic film is started, an adjustment process is carried out until the evaluation of the first temperature of the film material satisfies the quality condition of the film quality.

15. The method according to claim 4, wherein in that a calibration process is performed after the adjustment process, the temperature-dependent definition of the quality condition of the film quality being determined or redetermined.

16. A film machine with a device for monitoring a film quality during the production of a plastic film, the film machine comprising:
an outlet means configured to deliver film material of the plastic film to a transport device so that at least the film material cools in before or on the transport device; and
a sensor unit for detecting a first temperature of the film material in front of or at the transport device and a control unit for providing a temperature-dependent definition of a quality condition of the film quality and for evaluating the first temperature of the film material on the basis of the temperature-dependent definition of the quality condition, wherein the control unit is adapted to perform a method for monitoring a film quality in the production of a plastic film, comprising:
determining a first temperature of a film material of the plastic film at a first determination position during a transport of the film material at which the film material cools along a conveying direction of the film material, wherein the determining of the first temperature occurs on a transport device,
providing a first temperature-dependent definition of a quality condition of a film quality pertaining to the first determination position,
determining a second temperature at a second determination position, wherein the first and second determination positions are arranged in an axial direction or in the circumferential direction of the transport device, providing a second temperature-dependent definition of the quality condition of the film quality pertaining to the second determination position, and evaluating the quality condition of the film quality by evaluating the first temperature determined at the first determination position based on the first temperature-dependent definition and the second temperature determined at the second determination position based on the second temperature-dependent definition.

\* \* \* \* \*